United States Patent [19]
Stuckle

[11] Patent Number: 5,281,059
[45] Date of Patent: Jan. 25, 1994

[54] TOOL FOR REPAIRING DAMAGED THREADS IN A BLIND HOLE

[76] Inventor: Gary Stuckle, Rte. 2, Box 88, Davenport, Wash. 99122

[21] Appl. No.: 17,428

[22] Filed: Feb. 8, 1993

[51] Int. Cl.⁵ .............................................. B23G 5/14
[52] U.S. Cl. ................................. 408/156; 408/168; 408/222; 408/714; 470/201; 470/209
[58] Field of Search ............... 408/161, 168, 222, 714, 408/215-221; 470/198, 202, 203, 209, 200, 201

[56] References Cited

U.S. PATENT DOCUMENTS

| | | | |
|---|---|---|---|
| 53,996 | 4/1866 | Loomis | 408/168 X |
| 316,040 | 4/1885 | Johnson. | |
| 715,671 | 12/1902 | Krastin. | |
| 1,217,833 | 2/1917 | Santmyers et al. | |
| 1,418,721 | 6/1922 | Larson. | |
| 2,284,768 | 6/1942 | Ramsdell | 77/76 |
| 2,616,103 | 11/1952 | Stecher | 10/1 |
| 3,864,806 | 2/1975 | Hanson et al. | 29/401 |
| 4,661,028 | 4/1987 | Sanger | 408/165 |
| 5,025,556 | 6/1991 | Stafford | 29/888 |

FOREIGN PATENT DOCUMENTS

| | | | |
|---|---|---|---|
| 18795 | of 1929 | Australia | 470/200 |
| 627905 | 9/1961 | Canada | 470/209 |
| 19893 | of 1893 | United Kingdom | 470/200 |

Primary Examiner—Steven C. Bishop
Attorney, Agent, or Firm—Keith S. Bergman

[57] ABSTRACT

An adjustably expandable fluted tap to reform damaged threads defined in a blind hole, such as a spark plug hole. The tool provides an elongate body with a first end defining an expandable fluted tap having a relaxed diameter smaller than but matingly similar to the threads to be repaired, and a second end defining a butterfly handle. The body defines a medial channel carrying an arbor with a first end having a tapered forcing cone for expanding the fluted tap, and a second end threadedly engaged in a round knurled nut carried externally of the second end of the body. The tap is inserted in a hole beyond the damaged threads, the knurled nut tightened to retract the forcing cone to expand the fluted tap into mating engagement with the undamaged threads and the tool is then screwed out of the hole by revolving the butterfly handle to reform the damaged threads as it is withdrawn therepast.

2 Claims, 1 Drawing Sheet

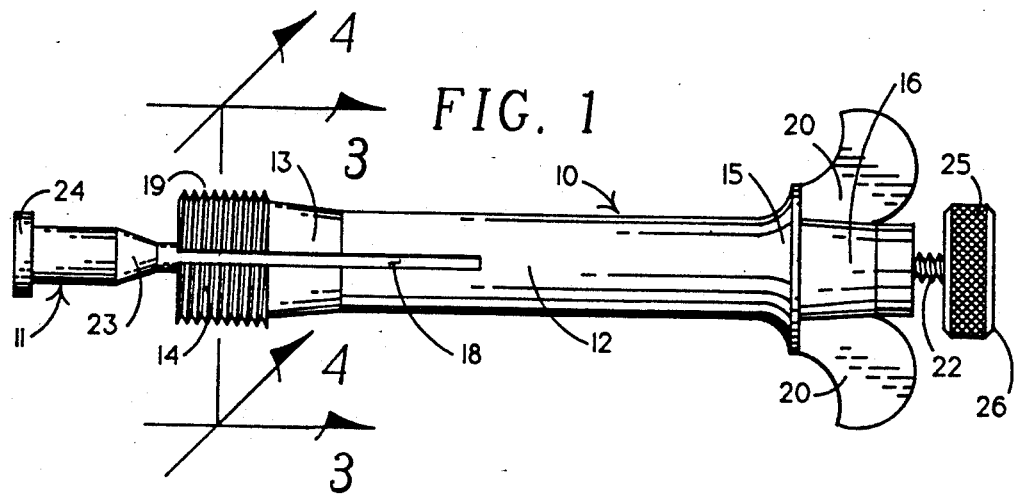
FIG. 1
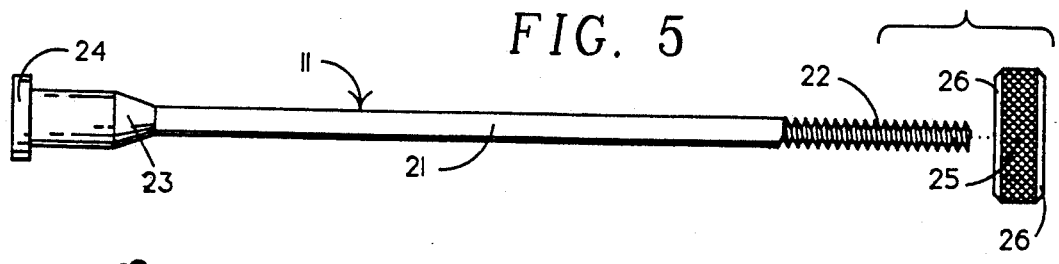
FIG. 5
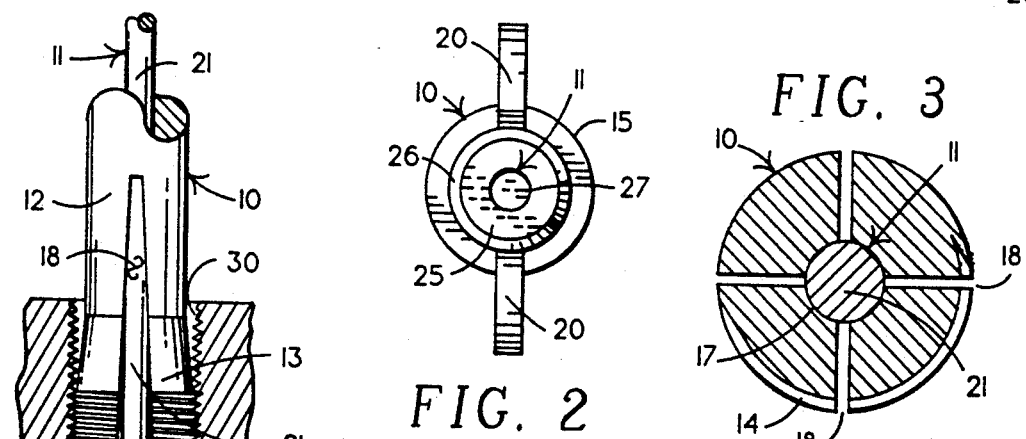
FIG. 2
FIG. 3
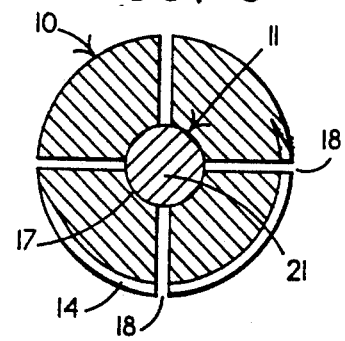
FIG. 6
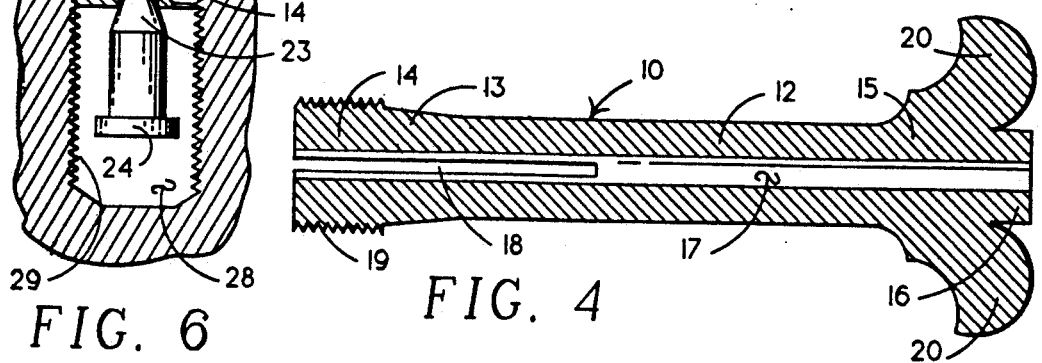
FIG. 4

TOOL FOR REPAIRING DAMAGED THREADS IN A BLIND HOLE

BACKGROUND OF INVENTION

A. Related Applications

There are no applications related hereto heretofore filed in this or any foreign country.

B. Field of Invention

This invention relates to tools for reforming damaged threads in a blind hole and more particularly to such a tool having a first fluted end that may be inserted past the damaged threads and expanded to repair those threads upon withdrawal.

C. Background and Description of Prior Art

Threaded blind holes are common in machinery and mechanical apparatus, such as spark plug holes in an engine block, plumbing holes in tanks, stud holes having one closed end and the like. Threads defined in such holes may become damaged during use and if this occurs, repair is often difficult or impossible. Various rethreading and thread repairing tools have heretofore become known to aid in repairing such damaged threads, but none of such prior devices have completely and effectively solved the problem. The instant invention presents a new, novel and improved tool of this class.

Most commonly when threads in a blind hole are damaged, the entire threaded structure is not damaged but rather only a portion. Most commonly the portion that is damaged is that immediately inwardly of the hole orifice as the damage generally is caused by insertion of a threaded element into a hole that is either misaligned upon attempted establishment or has threads of a different nature than those defined in the hole.

A thread reforming or repair tool to be operative must necessarily be aligned with the existing threaded structure and by reason of the position of damaged threads, this generally requires the tool to be established in the threaded structure inwardly of the damaged portion. The tools of the prior art either have not accomplished or have not effectively accomplishied this end.

My tool in contradistinction provides a relatively short, fluted thread forming portion at one end having a relaxed diameter smaller than the internal diameter of the thread to be reformed and with no portion of the tool on either side of the thread forming portion having a larger diameter. With this structure then, the tool may be inserted past damaged threads in a blind hole and there expanded into mating engagement with the good properly formed threads in the hole to establish a mating contact therewith so that upon rotational withdrawal from the hole the damaged threads are repaired and reformed in proper relationship with the original threads inwardly thereof.

The tool disclosed by Sanger in U.S. Pat. No. 4,661,028 is representative of prior devices. The reference teaches the use of a tapering and fluted threaded tap that is expandable by means of a forcing cone threadedly engaged on a rod carried in the medial channel axially defined through the tap. With this device the portion of the threading tap that first contacts the threads of an existing hole must necessarily be the portion adjacent the orifice of the threaded hole, since that is the diametrically largest portion of the rethreading tap. This causes the tap to first contact the damaged threads in a hole, which most probably may misalign the tap relative to the undamaged threads and if so, may further damage the threaded structure possibly to a point where it may not be repairable. It is this problem which the instant invention overcomes.

My invention resides not in this feature per se, but rather in the synergistic combination of all of the structures that necessarily give rise to the functions flowing therefrom as herein specified and claimed.

SUMMARY OF INVENTION

My tool provides an elongate body defining a diametrically larger, externally threading tap at one end, a thumb screw at the other end and a medial channel extending axially therethrough. The tap portion of the tool is divided by two diametrically extending flutes. A forcing arbor carried in the medial channel of the body extends therebeyond to irrotatably carry a forcing cone at the tap end and define a threaded portion at the other end carrying a knurled nut to move the forcing cone within the segmented tap to cause radial expansion thereof. The relaxed diameter of the threading tap is smaller than the minimum diameter of a threaded hole to be repaired, and the threads defined by the tap are of the same configuration as those to be repaired.

For use, the tap is inserted into a hole having damaged threads, beyond the point of thread damage, the forcing cone is then moved inwardly into the tap to expand it radially into a mating relationship with the threaded hole carrying it. The tool then is manually turned out of the hole by manipulation of the thumb screw to repair damaged threads as it passes outwardly therepast.

In providing such a device, it is:

A principal object to create a tool to reform damaged threads in a blind hole to their original configuration.

A further object is to provide such a tool that has a resiliently deformable fluted threading tap at one end that may be radially expanded to an operative configuration by a forcing arbor carried within a channel defined by the tool body.

A still further object of my invention is to provide such a tool with a threading tap that has limited axially extent and a relaxed external diameter incrementally less than the minimum diameter of the threaded hole to be repaired so that it may be expanded in the hole to establish a mating relationship with the existing threads in the hole.

A still further object is to provide such a tool that is of new and novel design, of rugged and durable nature, of simple and economic configuration and otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment of the best known mode being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an orthographic side view of my tool showing its various parts, their configuration and relationship.

FIG. 2 is an orthographic right end view of the tool of FIG. 1.

FIG. 3 is a transverse cross-sectional view of the threading tap portion of the tool of FIG. 1, taken on the line 3—3 in the direction indicated by the arrows thereon.

FIG. 4 is a longitudinal medial cross-sectional view of the tool body of FIG. 1, taken on the line 4—4 thereon in the direction indicated by the arrows.

FIG. 5 is an expanded orthographic side view of the forcing arbor of my tool, removed from the tool body.

FIG. 6 is a partially cut-away cross-sectional view showing my tool in expanded mode in a blind hole.

DESCRIPTION OF PREFERRED EMBODIMENT

My invention generally provides elongate body structure 10 movably carrying forcing arbor 11 in a medial channel.

Body 10 provides medial cylindrical portion 12 with threading tap 14 defined at one forward end and transitional element 15 communicating with thumb screw head 16 defined at the other rearward end. The radially medial portion of body 10 defines axially aligned cylindrical forcing arbor channel 17 extending between the body ends. The forward end portion of the body defining the threading tap is divided into four similar quadrantal portions by two perpendicular diametrically opposed flutes 18 extending from the body end to a spaced distance inwardly of forward transitional element 13.

Threading tap 14 has a relaxed diameter such that is incrementally less than the minimum diameter of the threads to be repaired so that the threading tap may be moved in the channel defined by those damaged threads. To be operable, the threading tap portion of the tool must have sufficient deformability to allow the tap to be expanded by the forcing arbor into a configuration where the tap threads are in immediate mating adjacency with the internal threads to be repaired. Normal tool steel in a configuration such as illustrated provides such characteristic. The particular threads 19 must be of the same configuration as the threads to be repaired when the threading tap is in expanded position for such repair.

Thumb screw head 16 provides a smaller cylindrical body portion carrying diametrically opposed radially extending wing elements 20 for grasping between the fingers of a user to aid manual manipulation in turning the tool during the thread reforming process. The configuration of the thumb screw head is not critical so long as it fulfills its purpose of aiding manual turning of the tool, and it may take the form of a nut, for use with secondary tools, or other similar forms.

Forcing arbor 11 provides elongate body 21 defining threaded portion 22 at the rearward end and forcing cone 23 having end cap 24 at the other forward end. The length of forcing arbor body 21 is slightly less than the length of tool body 10 so that the threaded portion 22 protrudes spacedly rearwardly from the body when the forcing cone 23 is immediately adjacent the forward end of the body. The diameter of body 21 is incrementally less than the diameter of forcing arbor channel 17 so that the forcing arbor body 21 is slidably carried within channel 17. Forcing cone 23 preferably has a relatively shallow central angle of approximately twenty-five degrees, though the angulation is not critical to my invention so long as the cone expands the threading die 14 as required.

The forcing cone nut provides cylindrical body 25 having a knurled cylindrical surface and chamfered end edges 26. The nut defines medial axially aligned hole 27 threaded to matingly engage threaded portion 22 of the forcing arbor body. The distance between the forcing cone and the threaded portion of the forcing arbor must be somewhat less than the length of body 10 so that the forcing cone can be moved into the forcing arbor channel to expand the threading tap as required.

Normally all of the various elements of my tool will be formed from a hard, rigid durable material having some elasticity to allow threading die expansion. Ordinary tool steel is the preferred material, when my tool has a configuration substantially as illustrated.

Having thusly described the structure of my tool, its use may be understood.

In FIG. 6, a blind hole 28 defining internal threads 29 having damaged portion 30 immediately inwardly of its orifice is illustrated. My tool is shown in that hole in an expanded mode ready to be removed from the hole to repair the damaged thread portion 30.

To use my tool to repair the threads in hole 28, the tool is established in its relaxed mode illustrated in FIG. 1 by moving nut 25 outwardly so that forcing cone 23 is released from any contact with the forward end portion of the body walls defining forcing arbor channel 17. In this condition, the diametrically largest part of the forward portion of the tool will be the threading die and its maximum external diameter will be incrementally less than the innermost diameter of threads 29, so that the threading die may be manually moved into hole 28 inwardly of damaged threads 30.

With the tool in the position illustrated in FIG. 6, nut 25 is tightened, or moved inwardly on threaded portion 22 of the forcing arbor, to gradually move forcing cone 23 into the forward portion of forcing arbor channel 17. As this occurs, the forcing cone expands the quadrantal portions of the threading tap radially outwardly in symmetrical fashion. This process is continued until the external surface of the threading tap 14 is in adjacency with threads 29 defined in hole 28. As the portion of the threading tap move radially outwardly into engagement with threads 29, the two threaded elements will automatically be aligned by the existing thread structure. Since the threading tap and threaded hole have identical threads, so long as the tool may move slightly in an axial direction during the tap expansion process, and since it contacts a portion of the hole having undamaged threads, the die is virtually impossible to misalign.

After the threading tap is aligned in adjacency with the existing undamaged threads 29, the tool is manually rotated in a direction to remove it from the hole. As this occurs, the tap remains in immediate adjacency with threads 29 and as the tap approaches and moves past damaged threads 30 it will reform those threads to conform insofar as possible to the original thread configuration. Normally when threads in the entryway of a blind hole are damaged, metal will not have been removed from the thread structure but rather only displaced from its original configuration, so that the threads will be reformed to substantially the same configuration as they originally had.

It should be noted that the forward end portion of my tool may be shortened in an axial direction if necessary for use in relatively shallow holes or in holes with relatively short threaded portions. It is only necessary that the threading tap include about one complete circular section of a thread. The structure forwardly of the forcing cone may be removed for use in shallow holes and the forcing cone itself should be no longer in an axial direction than necessary to expand the threading tap so that it comes into adjacency with the threads to be repaired. Preferably, however, the threading tap die does include several sections of thread to aid both the process of aligning the tap in a threaded hole and also the process of reforming the damaged threads.

It should also be noted that a single expandable tap may be usable in threaded holes of somewhat different diameters and possibly even with somewhat different threaded configurations, depending on the exact nature of those thread configurations. It is preferred, however, that a single tap be used for each particular thread configuration and hole size.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A tool for repairing damaged internal threads in a blind hole, comprising in combination:
   an elongate tool body defining a medial axially aligned forcing arbor channel and having
      at a first forward end a threading tap with a relaxed diameter incrementally less than the minimum diameter of an internally threaded hole to be repaired, the threading tap having
      at least one radially extending flute defined therethrough and through the body element spacedly adjacent to the threading tap to allow radial expansion,
      an external configuration that when expanded defines a surface that is complementary to internal threads in a hole to be repaired, and
      an axial length so that it may be inserted into a blind hole beyond a point of thread damage to there be expanded into a mating relationship with undamaged threads defined in that hole inwardly of the damaged threads, and
      at a second rearward end having means to aid the turning thereof; and
   an elongate forcing arbor having an arbor body carried in the forcing arbor channel defined in the tool body for axial slidable motion, said arbor body having a length less than the length of said tool body, and further having
      at a first rearward end a threaded portion extending axially outwardly from the tool body and carrying a threadedly engaged nut, and
      at a second forward end a forcing cone extending axially forward of the tool body and movable within the forward portion of the forcing arbor channel responsive to motion of the nut on said threaded portion of the forcing arbor to radially expand the threading tap into adjacency with threads to be repaired.

2. The tool of claim 1 further characterized by the means to aid turning of the body comprising a thumb screw head having diametrically opposed radially extending wing elements to aid grasping and turning by the fingers of a user.

* * * * *